US009383629B2

(12) United States Patent
Bier et al.

(10) Patent No.: US 9,383,629 B2
(45) Date of Patent: Jul. 5, 2016

(54) CAMERA STAND

(71) Applicants: Heinrich Bier, Winnipeg (CA); Mike Grant, Dryden (CA)

(72) Inventors: Heinrich Bier, Winnipeg (CA); Mike Grant, Dryden (CA); Kevin Bailey, Ottawa (CA); Dave Ingram, Ottawa (CA); Yana Klimava, Ottawa (CA)

( * ) Notice: Subject to any disclaimer, the term of this patent is extended or adjusted under 35 U.S.C. 154(b) by 0 days.

(21) Appl. No.: 14/560,418

(22) Filed: Dec. 4, 2014

(65) Prior Publication Data

US 2015/0160537 A1 Jun. 11, 2015

Related U.S. Application Data

(60) Provisional application No. 61/912,539, filed on Dec. 5, 2013.

(51) Int. Cl.

| | |
|---|---|
| ***F16M 11/04*** | (2006.01) |
| ***G03B 17/56*** | (2006.01) |
| ***F16M 13/02*** | (2006.01) |
| ***F16M 11/28*** | (2006.01) |

(52) U.S. Cl.

CPC ............ *G03B 17/561* (2013.01); *F16M 11/28* (2013.01); *F16M 13/022* (2013.01)

(58) Field of Classification Search

USPC ........... 248/177.1, 166, 169, 434, 435, 187.1, 248/178.1, 218.4, 219.3, 539, 540, 541; 396/419, 421, 423, 428

See application file for complete search history.

(56) References Cited

U.S. PATENT DOCUMENTS

| | | | | | |
|---|---|---|---|---|---|
| 5,839,704 | A * | 11/1998 | Appleman | F16M 13/04 224/584 |
| 7,017,873 | B2 * | 3/2006 | Barth | F16M 13/04 248/177.1 |
| D574,083 | S * | 7/2008 | Tassakos | D24/172 |
| 7,703,995 | B1 * | 4/2010 | Sivan | F16M 11/2092 224/185 |
| 8,328,359 | B2 * | 12/2012 | Monroe | F16M 11/14 348/376 |
| 2006/0197001 | A1 * | 9/2006 | Parker | F16M 13/02 248/230.8 |

* cited by examiner

*Primary Examiner* — Steven Marsh

(74) *Attorney, Agent, or Firm* — Razmig H. Messerian; Loza & Loza, LLP

(57) ABSTRACT

A camera stand is disclosed, that can be fastened and secured onto a post or the like via an attachment means. The camera stand is further comprised of a base plate and a reversible nut on which one can attach a camera or other recording device. A telescopic arm links the attachment means to the base plate, such that once the camera stand is secured onto a post or the like, the telescopic arm is either retracted or extended depending on the desired position of the camera. The camera stand is generally designed to be secured onto a boat in order for one to film or take pictures while boating and fishing; however, it is clear that the camera stand can be applied in a plethora of situations where pictures or film need to be taken from a particular vantage point.

11 Claims, 9 Drawing Sheets

CAMERA STAND

CLAIM OF PRIORITY

The present application for patent claims priority to U.S. Provisional Application No. 61/912,539 entitled "Camera Stand" filed Dec. 5, 2013, the entire disclosure of which is hereby expressly incorporated by reference herein.

BACKGROUND

1. Field

The present invention relates to the field of camera accessories, and more specifically to an adjustable telescopic camera stand.

2. Background

In this newest wave of advanced technology, cameras and video recorders have become increasingly more sophisticated at decreasing costs. Whereas decades ago cameras were only available to an elite few, today they are widely available to the general public. As a result, a plethora of accessories for cameras have been designed and developed, and have thus become popular tools for even the average camera enthusiast.

Many accessories have been devised that provide a means for a camera to stand atop a post in order to stabilize the camera and/or allow for the photographer to get himself or herself into the shot. Indeed, devices such as U.S. Pat. No. 7,712,710 (Root), U.S. Pat. No. 6,056,450 (Walling) and U.S. Pat. No. 5,173,725 (Giles).

Root discloses a camera stand which consists of a column mounted on a base section. The head unit includes a pivoting element that can be tilted horizontally and secured in place. Unfortunately, said device is not telescopic in nature and must use a prefabricated base section, or at least a base with a connection means of a certain diameter in order to affix the stand. Further, Root's device is meant to be sat on a flat surface such as pavement; it cannot be positioned properly in a moving vehicle such as a boat, without outside assistance from the photographer which would defeat the purpose of having the stand.

Meanwhile, Walling discloses a camera support device which is telescopic in nature. The device also comprises a support base, a rotatable pole and a tiltable camera mount. Despite adding a telescopic element to the device in Root, Walling's device cannot be affixed to all types of bases. Indeed, said device must be mounted to a specific base that is also utilized to stabilize the overall camera support device. This device is only suitable for a flat surface that does not move and would not accommodate the swaying surface as found in boats.

Finally, Giles' device discloses a camera mount for a boat. Said camera mount comprises a base which has an upright spindle, in order to engage a turret on the device. Giles' patent can be mounted on an existing boats' post or pylon, and includes a locking ring and fastener element in order for the base to be secured to the post.

Overall, all three enumerated patents have problems that need to be overcome in order for a device to secure a camera to various structures, including, but not limited to, existing posts on a boat. Indeed, a device is required having two opposable surfaces that can both be fastened to posts, branches, racks, etc., or other similar objects provided that at least one of the objects eventually connects to a camera. The present device has these features and can thus overcome the aforementioned issues.

SUMMARY

The present invention provides for a telescopic camera stand comprising an attachment means to fasten the camera stand to a post; at least one telescopic arm connected to the attachment means; a reversible nut in threaded engagement with the at least one telescopic arm; and, a base plate operatively connected to the reversible nut and fastened to the at least one telescopic arms by means of the reversible nut.

BRIEF DESCRIPTION OF THE DRAWINGS

It will now be convenient to describe the invention with particular reference to one embodiment of the present invention. It will be appreciated that the drawings relate to one embodiment of the present invention only and are not to be taken as limiting the invention.

DETAILED DESCRIPTION

The present invention will now be described more fully hereinafter with reference to the accompanying drawings, in which preferred and other embodiments of the invention are shown. No embodiment described below limits any claimed invention and any claimed invention may cover processes or apparatuses that are not described below. The claimed inventions are not limited to apparatuses or processes having all the features of any one apparatus or process described below or to features common to multiple or all of the apparatuses described below. It is possible that an apparatus or process described below is not an embodiment of any claimed invention. The applicants, inventors or owners reserve all rights that they may have in any invention claimed in this document, for example the right to claim such an invention in a continuing application and do not intend to abandon, disclaim or dedicate to the public any such invention by its disclosure in this document.

Figure 1:
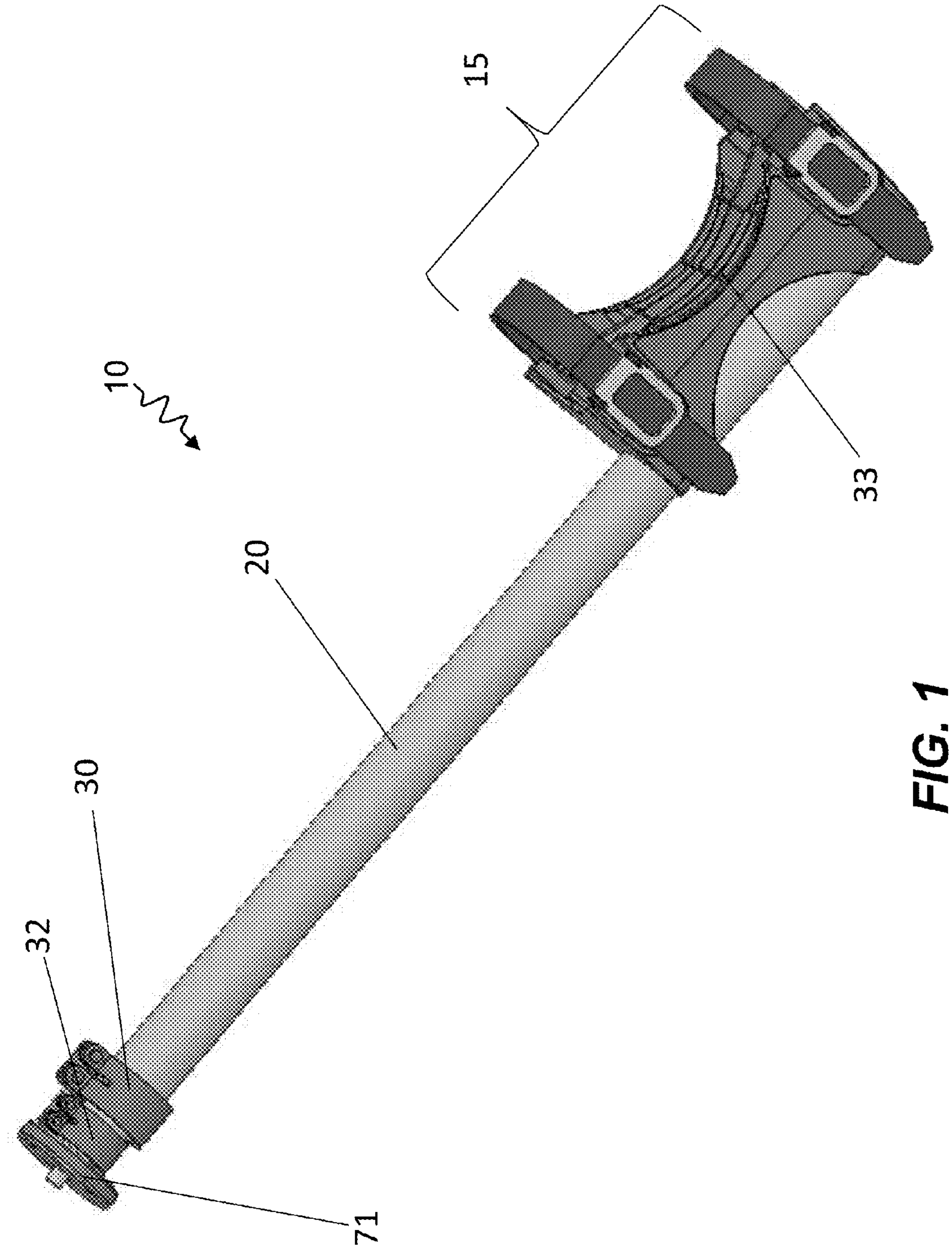
FIG. 1 is a perspective view of a camera stand, according to one embodiment of the present invention.

With reference to FIG. 1 and according to one embodiment of the present invention, a telescopic camera stand 10 is generally comprised of an attachment means 15 secured at an opposite end of a telescopic arm 20, a securing portion 71 for securing a camera thereon, and arm locks 30, 32. The attachment means 15 is generally comprised of a first opposable area 33 and a second opposable area (not shown) which enable the camera stand 10 to have the first opposable area 33 fastened to posts, pillars, supports, poles, columns, branches, or other similar objects, while the second opposable area (not shown) can be fastened to another object such as a telescopic arm 20 which can support a camera. In this particular embodiment, the first opposable area 33 is not secured to anything, while the second opposable area (not shown) is fastened to the telescopic arm 20. The functioning of the camera stand 10 is further described below. A worker skilled in the art would appreciate that the telescopic arm 20 does not need to be telescopic, in fact said arm 20 can work properly and can be within the scope of the present invention despite not having the functionality of being telescopic and will be referred to hereinafter as either "arm" or "telescopic arm". A worker skilled in the art would further appreciate that the angle of mounting the camera stand, whether it be vertical, horizontal or any other angle off of the post or other similar surface is possible without departing from the spirit and scope of the present invention.

Figure 2:
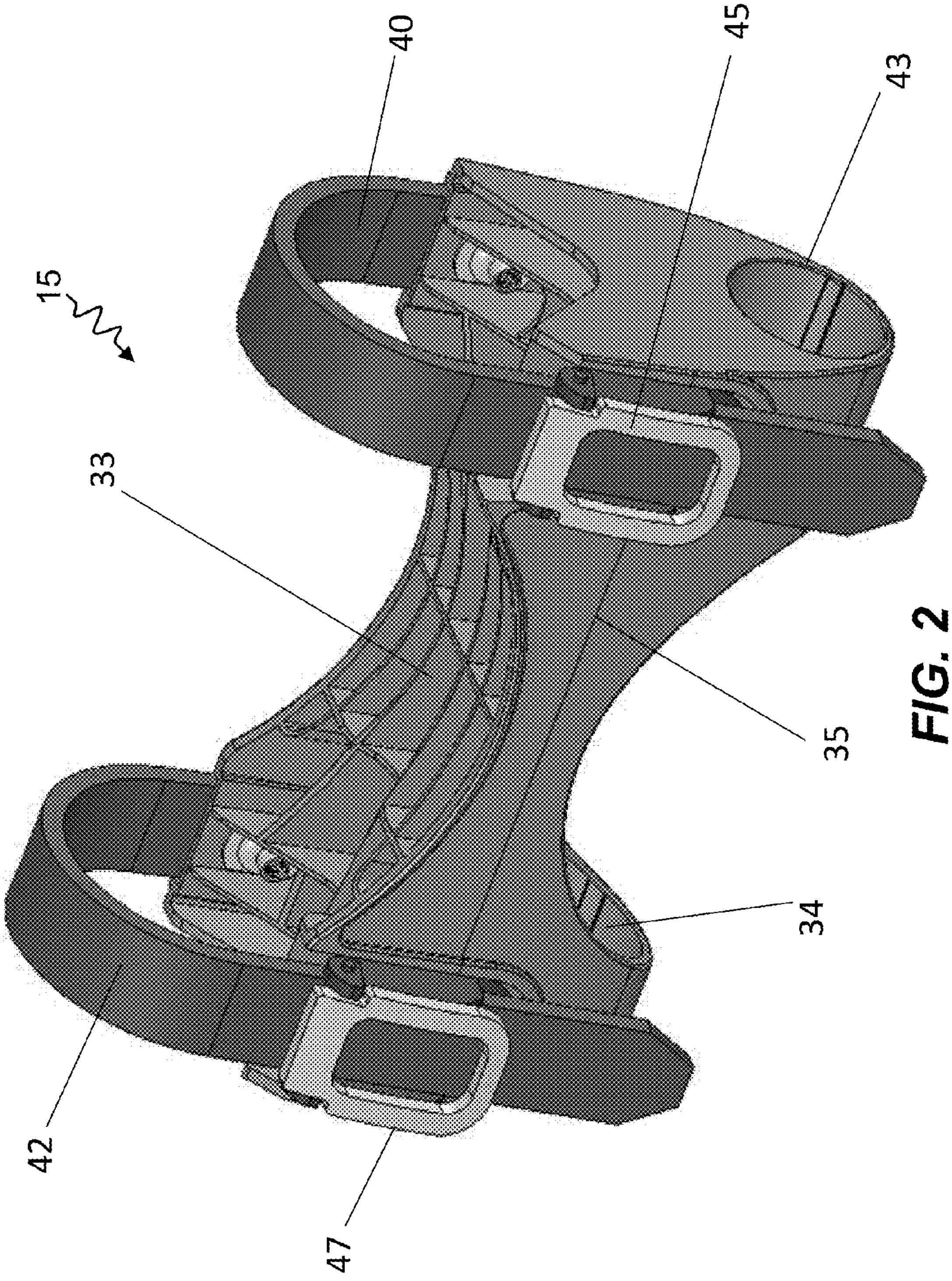
FIG. 2 is a front perspective view of an attachment means of a camera stand, according to one embodiment of the present invention.
Figure 2A:
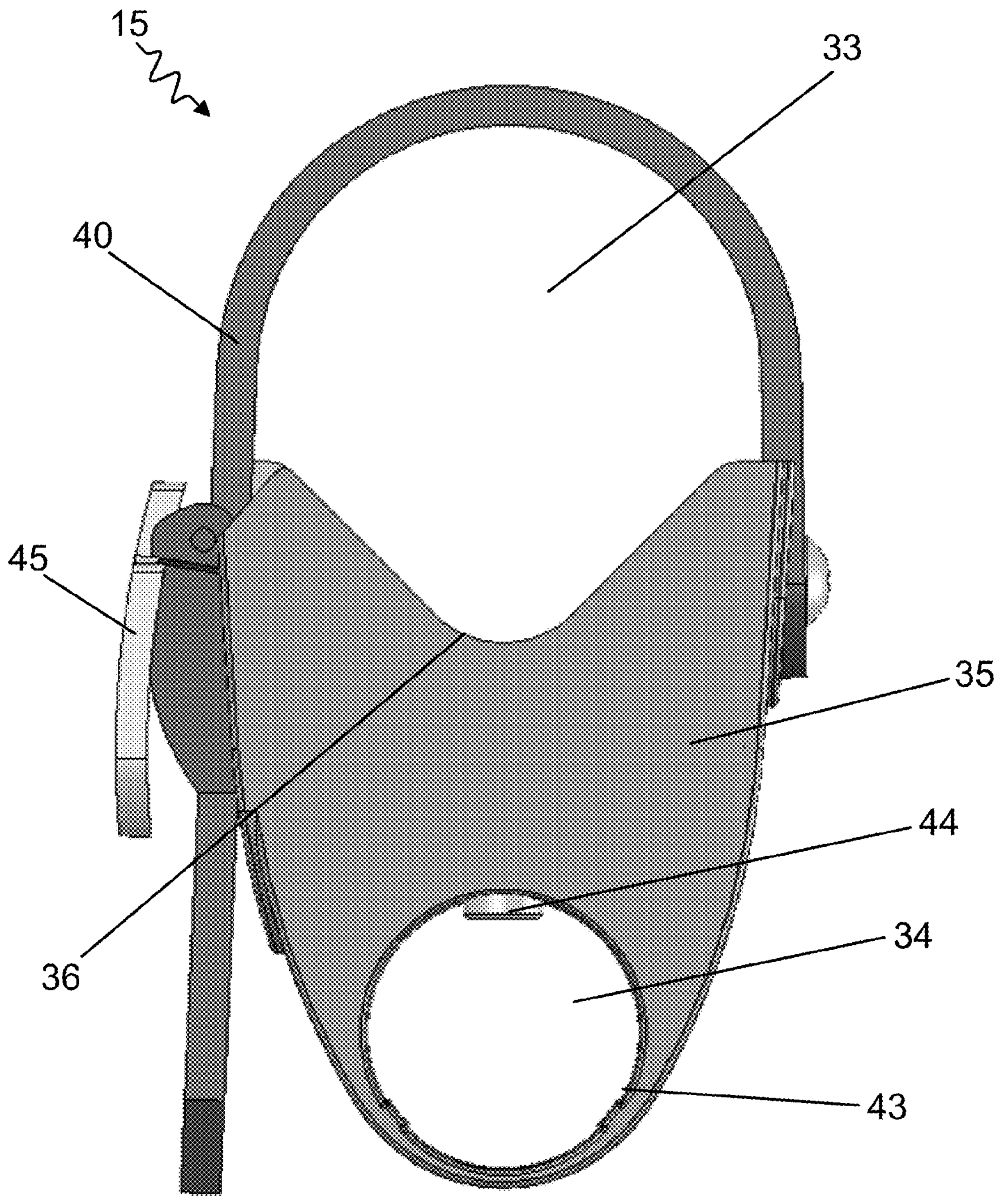
FIG. 2*a* is a side view of an attachment means of a camera stand, according to one embodiment of the present invention.

With reference to FIGS. 2 and 2*a* and according to one embodiment of the present invention, the attachment means 15 defines first and second opposable areas 33, 34 and is preferably comprised of a base 35, first and second straps 40, 42, first and second corresponding buckles 45, 47 with teeth (not shown) thereon. The first and second straps 40, 42 contain various ridges (not shown) thereon, which lock onto place on corresponding teeth (not shown) of the first and second buckles 45, 47. A worker skilled in the relevant art would appreciate that said ridge and teeth mechanism is well known in the art, and could be replaced with another similar system, provided that said similar system would provide the same advantages as are currently experienced. Namely, the present system is strong, waterproof, durable, flexible and resistant to sun damage. In fact, the first and second straps 40, 42 will be predominantly made of polyurethane plastic or a similar compound to exhibit said aforementioned properties.

Figure 3:
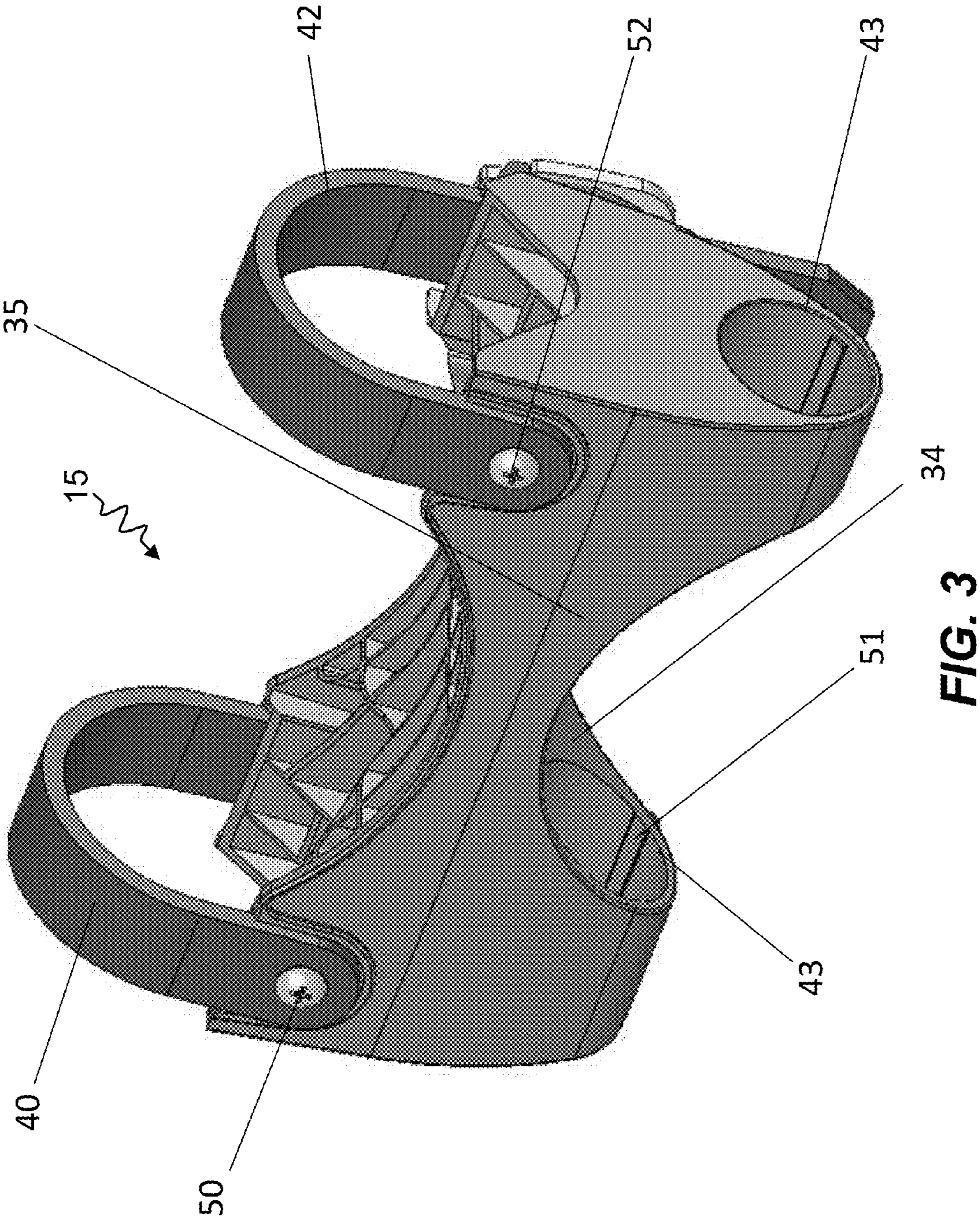
FIG. 3 is a rear perspective view of an attachment means of a camera stand, according to one embodiment of the present invention.

With reference to FIGS. 2*a* and 3, the first opposable area 33 of the attachment means 15 is perimetrically defined by both the V-shaped surface 36 and first and second straps 40, 42. The V-shaped surface is not a solid unit; rather, it is machined in such a way with various ribs in order to be more structurally secure while being cost effective. As such, the first opposable 33 has its perimeter defined by the area in between the outer edge of the first and second straps 40, 42, and by the curvature as defined by the V-shaped surface 36. Said first and second straps 40, 42 are meant to secure many types of objects as defined above in between the first and second straps 40, 42 and the V-shaped surface 36, thereby locking them within the first opposable area 33. In order to secure an object such as a post (not shown) within the first opposable area 33, the first and second buckles 45, 47 are undone in order to loosen the first and second straps 40, 42 which are being held in place at the other extremity by virtue of first and second screws 50, 52. Meanwhile, the second opposable area 34 can be seen perimetrically defined by the area surrounded by two circular apertures 43. The second opposable area 34 is further shown and described below.

Figure 4:
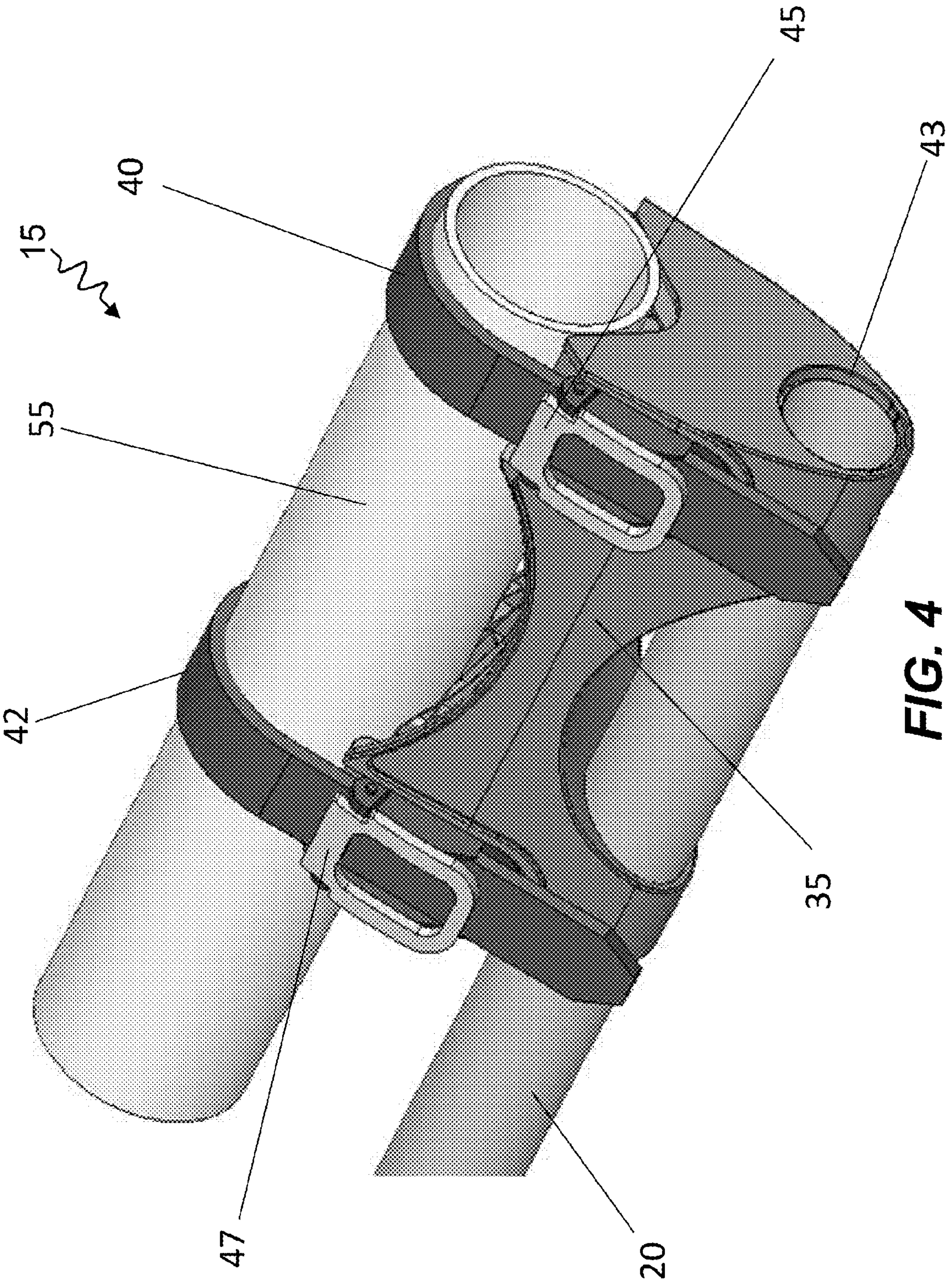
FIG. 4 is a perspective view of an attachment means, fastened to both a post and a telescopic arm of the camera stand, according to one embodiment of the present invention.

With reference to FIGS. 3 and 4, the first and second straps 40, 42 are then refastened to said first and second buckles 45, 47 and a post 55 or other object is secured therein. The size of first and second straps 40, 42 can accommodate a multitude of post sizes, and a worker skilled in the relevant art would appreciate that the attachment means 15 could also be fastened to other types of posts, including beams, ski and wakeboard towers, etc, without departing from the spirit and score of the present invention. A worker skilled in the relevant art would also appreciate that while standard buckles are used herein, the attachment means could be comprised of clasps, fasteners, hooks, clips or other similar devices as known in the art provided that they exhibit the properties as previously expound upon. Meanwhile, the second opposable area 34 of the attachment means 15 is perimetrically defined by two circular apertures 43 located within the attachment means 15 and a securing pin (not shown). In other words, the perimeter of the diameter of the two apertures 43 defines the second opposable area 34. A securing pin (not shown) is threaded onto the base 35 of the attachment means 15 and can be tightened in order to accommodate various widths of the relevant objects that will be fastened within. In this particular embodiment, in order to further fasten the telescopic arm (not shown) within the second opposable area 34, a longitudinal guide 51 is present which correspondingly fits into a longitudinal recess (not shown) of the telescopic arm (not shown), which prevents the arm (not shown) from turning either clockwise or counter-clockwise and disrupting filming or picture taking from the camera. A worker skilled in the relevant art would appreciate that the base 35 could be made of various materials, provided that they are rigid and durable in order to properly support the arm 20. A worker skilled in the relevant art would further appreciate that said base 35 could be of various shapes and sizes, provided that there are two opposable areas 33, 34.

Figure 5:
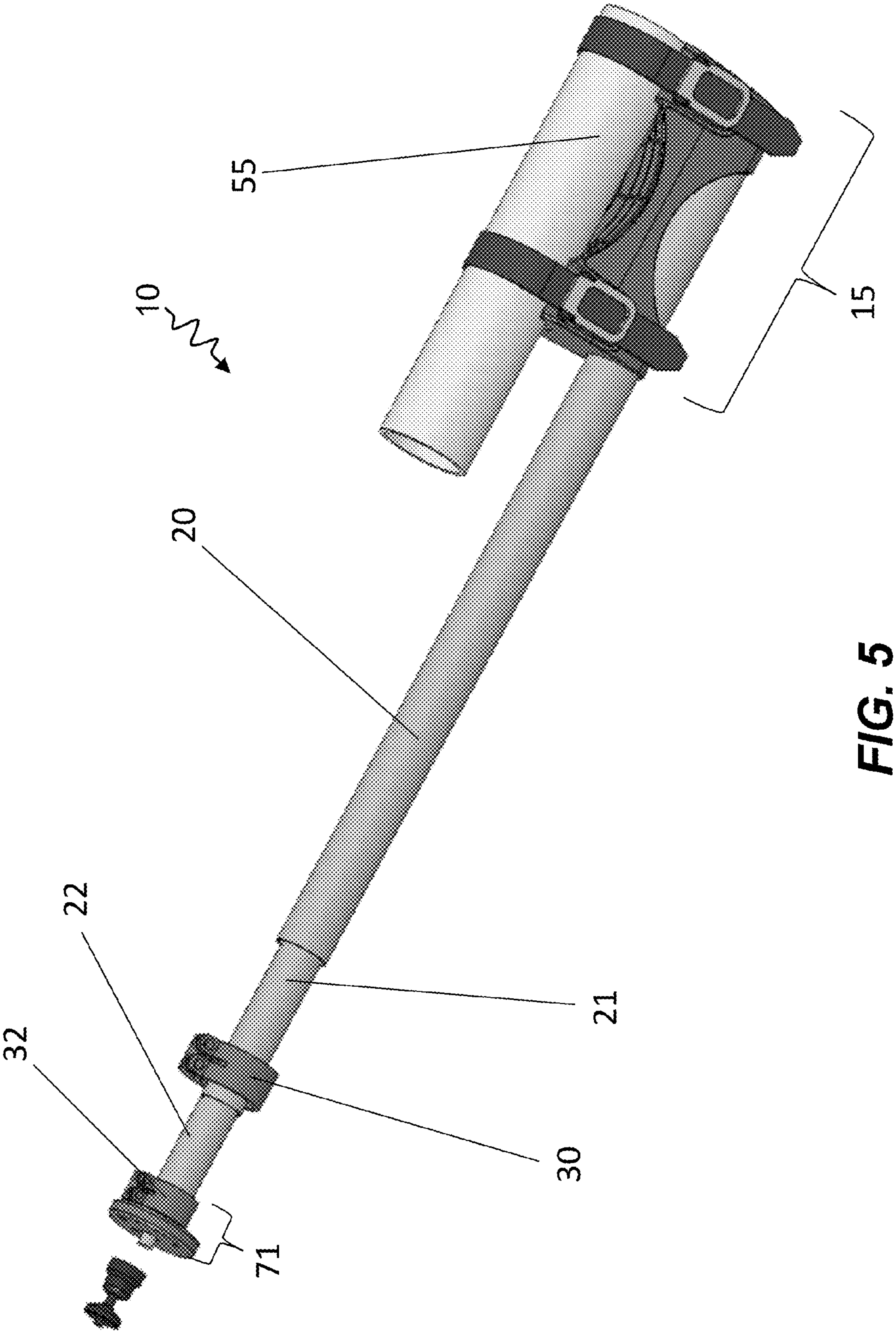
FIG. 5 is a perspective view of a camera stand attached to a post, according to one embodiment of the present invention.

With reference to FIG. 5 and according to one embodiment of the present invention, the camera stand 10 is shown with the telescopic arm 20 partially extended into three constituent parts: the arm 20, and secondary arm 21 and tertiary arm 22. In its shortest possible size, said tertiary arm 22 is completely retracted within the secondary arm 21, while said secondary arm 21 is completely retracted within the arm 20, as was shown in FIG. 1. The purpose of the retractable and extendible arm 20 is that the camera may be adjusted to be positioned at a desired height, depending on the relative position of the subject which needs to be photographed or filmed.

Figure 6:
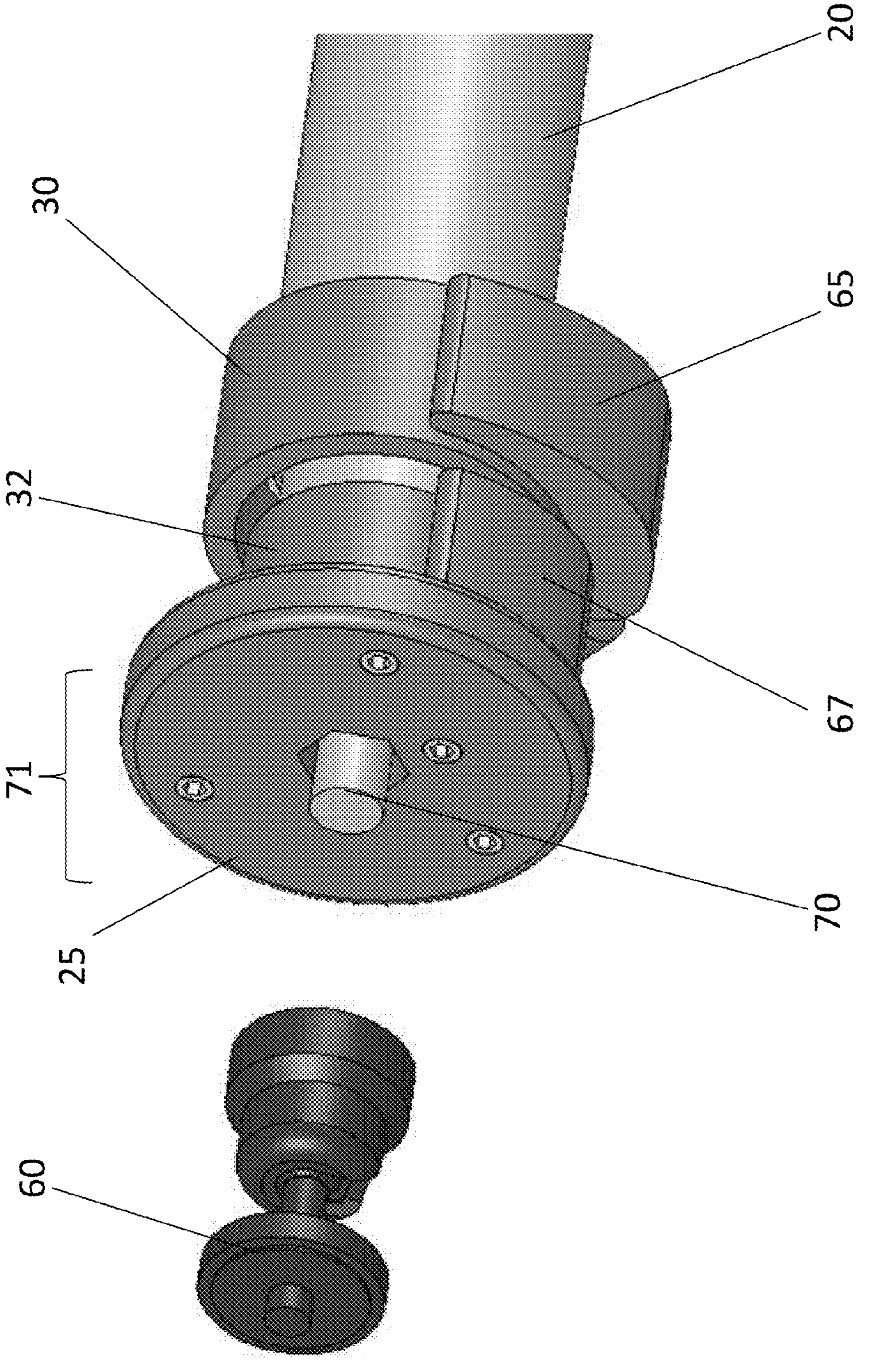
FIG. 6 is a detailed perspective view of a base plate and reversible nut located at one extremity of the telescopic arm of the camera stand, according to one embodiment of the present invention.

With further reference to FIG. 5 and with reference to FIG. 6, the other extremity of the arm 20 is primarily comprised of first and second arm locks 30, 32, an optional ball bearing camera mount 60 and a securing portion 71 further comprised of a base plate 25 and a reversible nut 70. The base plate 25 is secured within the arm 20 by means of screws. The camera can sit properly and is secured safely onto the securing portion 71 by means of the base plate 25 through the reversible nut 70 protruding from said base plate 25. Said first and second locks 30, 32 are preferably comprised of first and second corresponding clasps 65, 67 which serve to allow for the loosening and tightening of the secondary and tertiary arms 21, 22. Indeed, the first clasp 65 tightens around the arm 20 in order to secure the secondary arm 21, while the second clasp 67 tightens around the secondary arm 21 to secure the tertiary arm 23. This adjustability results in the camera stand 10 being able to extend and retract according to the desired height or length, depending on the orientation of said camera stand 10 as was explained above. An optional ball head camera mount 60 is shown in greater detail and is meant to connect to both the reversible nut 70 and to standard cameras and recorders. Said optional ball head camera mount 60 is well known in the art and does not form part of the present camera stand 10. The optional ball head camera mount 60 only serves as an accessory to be utilized in conjunction with cameras for additional camera control. In this particular embodiment, the camera stand 10 and specifically the attachment means 15 are shown fastened to a post 55; however, as was previous explained, the camera stand 10 could be fastened to a variety of different objects without departing from the spirit and scope of the invention.

Figure 7:
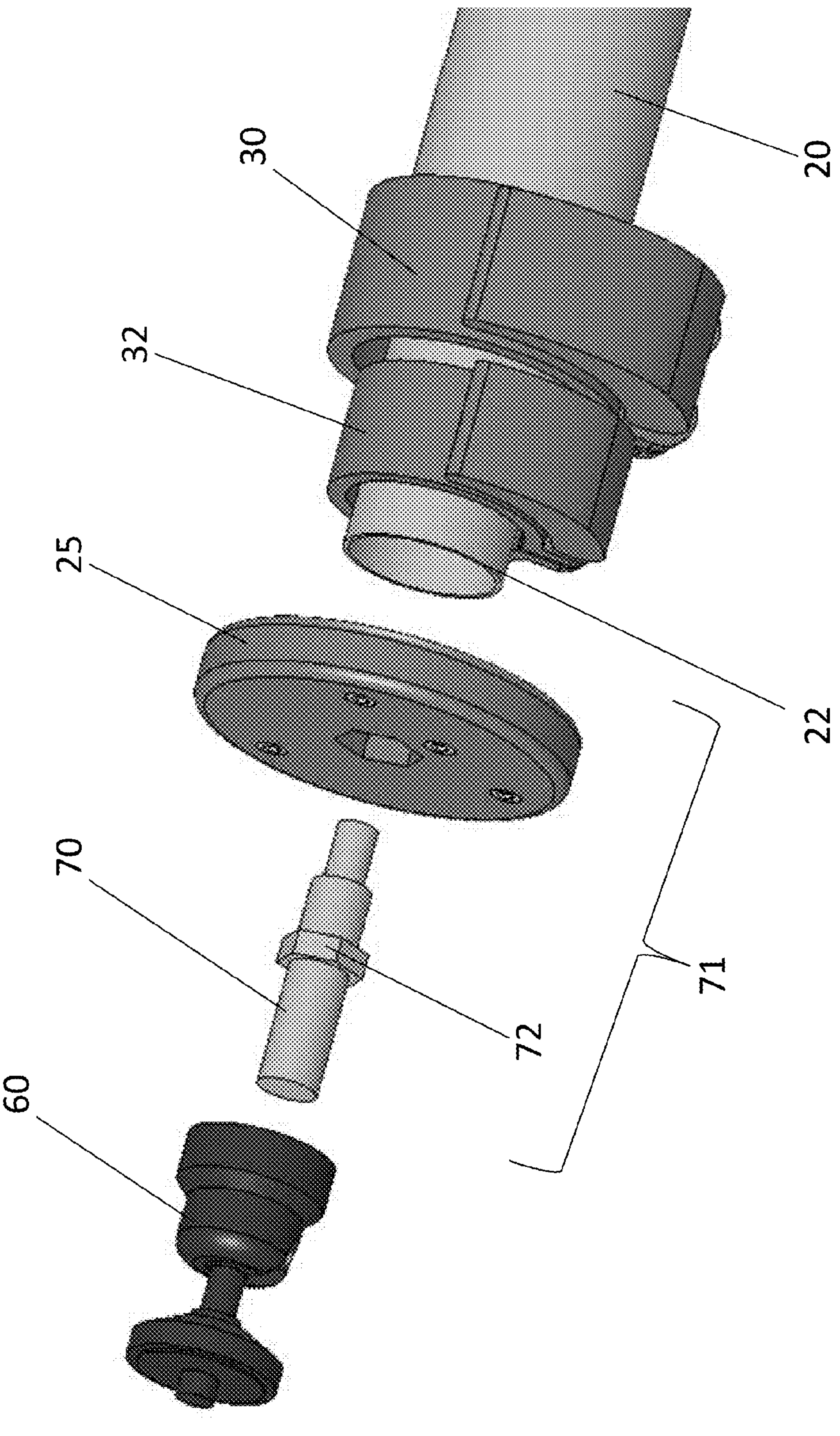
FIG. 7 is an exploded view of the base plate, ball head camera mount and reversible nut of a camera stand, according to one embodiment of the present invention.

With further reference to FIG. 6 and with reference to FIG. 7, the camera stand 10 is further comprised of a securing portion 71 which is itself comprised of a reversible nut 70 generally secured within the base plate 25. Said reversible nut 70 is comprised of two opposing threaded ends, which have two different sizes: ¼-20 and ⅜ inches. Said opposing threaded ends of the reversible nut 70 correspond to the two most widely used sizes in cameras and video recorders, such that various cameras can be easily mounted to the reversible nut 70 and base plate 25 by simply removing the optional ball head camera mount 60 and base plate 25, reversing the reversible nut 70, replacing said reversible nut 70 into the base plate 25 and optionally replacing the ball head camera mount 60 with the appropriately sized variation. The reversible nut 70 is in threaded engagement within the tertiary arm (not shown) and can be secured within said tertiary arm (not shown). A worker skilled in the relevant art would appreciate the said ball head camera mount could 60 come in a variety of shapes and sizes in order to accommodate various types and sizes of camera and recorders, as well as an array of budgets such that a more expensive version could be included in a high quality version of the camera stand 10, or a less expensive version for tighter budgets. A worker skilled in the art would further appreciate that said ball bearing camera mount 60 could pivot such that the camera or recording device would be able to rotate around a central point on the tertiary arm (not shown).

Figure 8:
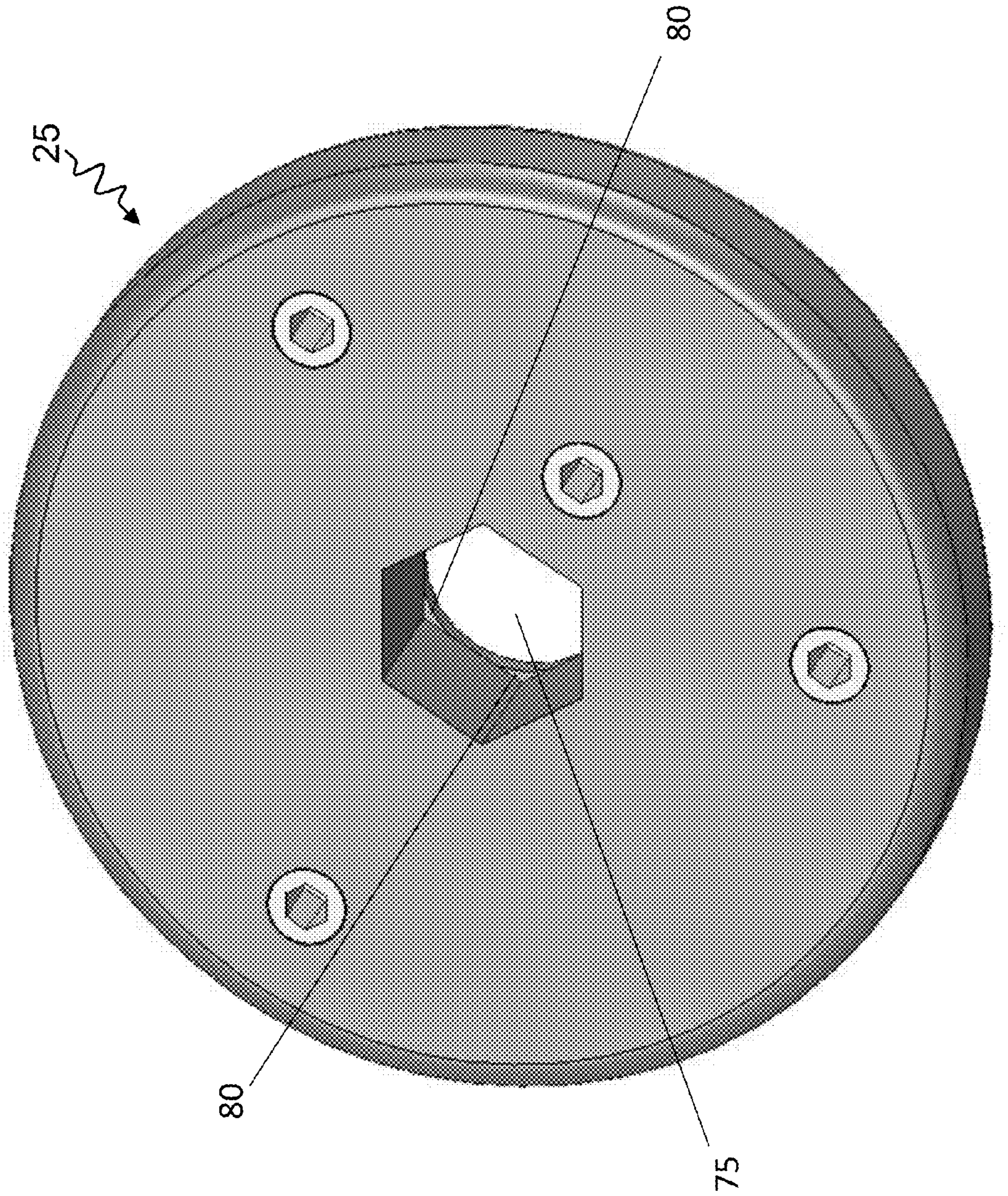
FIG. 8 is a detailed perspective view of a base plate of the camera stand, according to one embodiment of the present invention.

With reference to FIGS. 6, 7 and 8, the base plate 25 can be secured to the tertiary arm 22 by means of a securing aperture 75, which helps fasten the reversible nut 70 to the inside of said tertiary arm 22. As is shown, the securing aperture 75 is shaped in a hexagon, which corresponds and is operatively connected to a central hexagonal portion 72 of the reversible nut 70. The securing aperture 75 is further comprised of an abutment portion 80, which serves to prevent the central hexagonal portion 72 of the reversible nut 70 from being forced completely through said securing aperture 75. As such, in order to secure the base plate 25 to the tertiary arm 22, the reversible nut 70 is first inserted within the securing aperture 75 of the base plate 25, and into the tertiary arm 22. Once the corresponding central hexagonal portion 72 of the reversible nut 70 is secured within the securing aperture 75, the base plate 25 is rotated in order to thread the reversible nut 70 into the tertiary arm 22 until the base plate 25 is flush with said tertiary arm 22 and the central hexagonal portion 72 is flush with the abutment portion 80. A worker skilled in the relevant art would appreciate that the threaded connection between the reversible nut 70 and the tertiary arm 22 could easily be replicated with any arm, such that the camera stand 10 could be comprised of any number of arms without departing from the scope of the invention.

Although the invention has been described above by reference to certain embodiments of the invention, the invention is not limited to the embodiments described above. Modifications and variations of the embodiments described above will occur to those skilled in the art in light of the above teachings. Moreover, with respect to the above description, it is to be repulsed that the optimum dimensional relationships for the component members of the present invention may include variations in size, material, shape, form, funding and manner of operation.

What is claimed is:

1. A camera stand comprising:

a. a securing portion for securing a camera thereon;

b. an arm fastened to the securing portion for providing a height to the camera and securing portion; and c. an attachment means secured at an opposite end of the arm further comprised of:

i. a first opposable area perimetrically defined by a V-shaped surface and at least one strap for securing the camera stand onto a surface;

ii. a second opposable area perimetrically defined by two circular apertures which allow the securing of a telescopic arm.

2. The camera stand of claim 1, wherein the securing portion is further comprised of a reversible nut and a base plate.

3. The camera stand of claim 1, wherein the arm is the telescopic arm and is adapted to adjust the height of the camera.

4. The camera stand of claim 1, wherein the first opposable area is perimetrically defined by a V-shaped surface and at least two straps for securing the camera stand onto the surface.

5. The camera stand of claim 1, wherein the at least one strap is further comprised of various ridges thereon for securing within a buckle.

6. The camera stand of claim 3, wherein the telescopic arm is comprised of a secondary arm and arm lock to secure the secondary arm within the telescopic arm.

7. The camera stand of claim 2, wherein the reversible nut is comprised of a central hexagonal portion.

8. The camera stand of claim 7, wherein the base plate is comprised of a securing aperture.

9. The camera stand of claim 8, wherein the base plate is further comprised of an abutment portion to prevent the central hexagonal portion of the reversible nut from being forced completely through the securing aperture.

10. The camera stand of claim 1, wherein the second opposable area is further comprised of a longitudinal guide.

11. The camera stand of claim 10, wherein the arm is comprised of a longitudinal recess for engaging the longitudinal guide.

* * * * *